United States Patent [19]

Kazmierski, Jr. et al.

[11] 4,140,338
[45] Feb. 20, 1979

[54] HIGH TEMPERATURE EXPANSION JOINT

[75] Inventors: John Kazmierski, Jr., Trenton; Craig E. Thornton, Flemington; John L. Ambrose, Bound Brook; Frederick S. Dmuchowski, Manville, all of N.J.

[73] Assignee: Johns-Manville Corporation, Denver, Colo.

[21] Appl. No.: 800,772

[22] Filed: May 26, 1977

[51] Int. Cl.² .................. F16L 21/00; F16L 27/10; F16L 51/02; F16L 59/16
[52] U.S. Cl. .................................. 285/229; 138/149; 285/53; 285/236
[58] Field of Search ............... 285/229, 236, 223, 224, 285/226, 227, 228, 235, 423, 53; 138/147, 149, 124; 428/36, 271, 443, 444

[56] References Cited

U.S. PATENT DOCUMENTS

| 397,822 | 2/1889 | Suhr | 138/149 X |
|---|---|---|---|
| 3,315,704 | 4/1967 | Shire | 285/226 X |
| 3,460,856 | 8/1969 | Van Tine et al. | 285/236 X |
| 3,730,566 | 5/1973 | Kazmierski, Jr. et al. | 285/229 |
| 3,874,711 | 4/1975 | Scalzo et al. | 285/236 |
| 3,934,905 | 1/1976 | Lockard | 285/229 |
| 3,948,295 | 4/1976 | Lemont et al. | 138/149 X |
| 4,063,755 | 12/1977 | Merz | 285/236 X |

FOREIGN PATENT DOCUMENTS

| 2022672 | 12/1971 | Fed. Rep. of Germany | 285/235 |
|---|---|---|---|
| 2357327 | 5/1975 | Fed. Rep. of Germany | 285/235 |
| 2266095 | 10/1975 | France | 285/227 |

Primary Examiner—Mervin Stein
Assistant Examiner—Carl F. Pietruszka
Attorney, Agent, or Firm—Robert M. Krone; Joseph J. Kelly; James W. McClain

[57] ABSTRACT

An expansion joint for duct work is disclosed, which comprises a pair of frames, spacer means extending outwardly from said frames, and a boot. The boot has five layers: an inner asbestos/aluminum/silica material, a fibrous insulation batt, a middle asbestos/aluminum material, a vapor barrier, and an outer asbestos/fluoroelastomer material.

7 Claims, 3 Drawing Figures

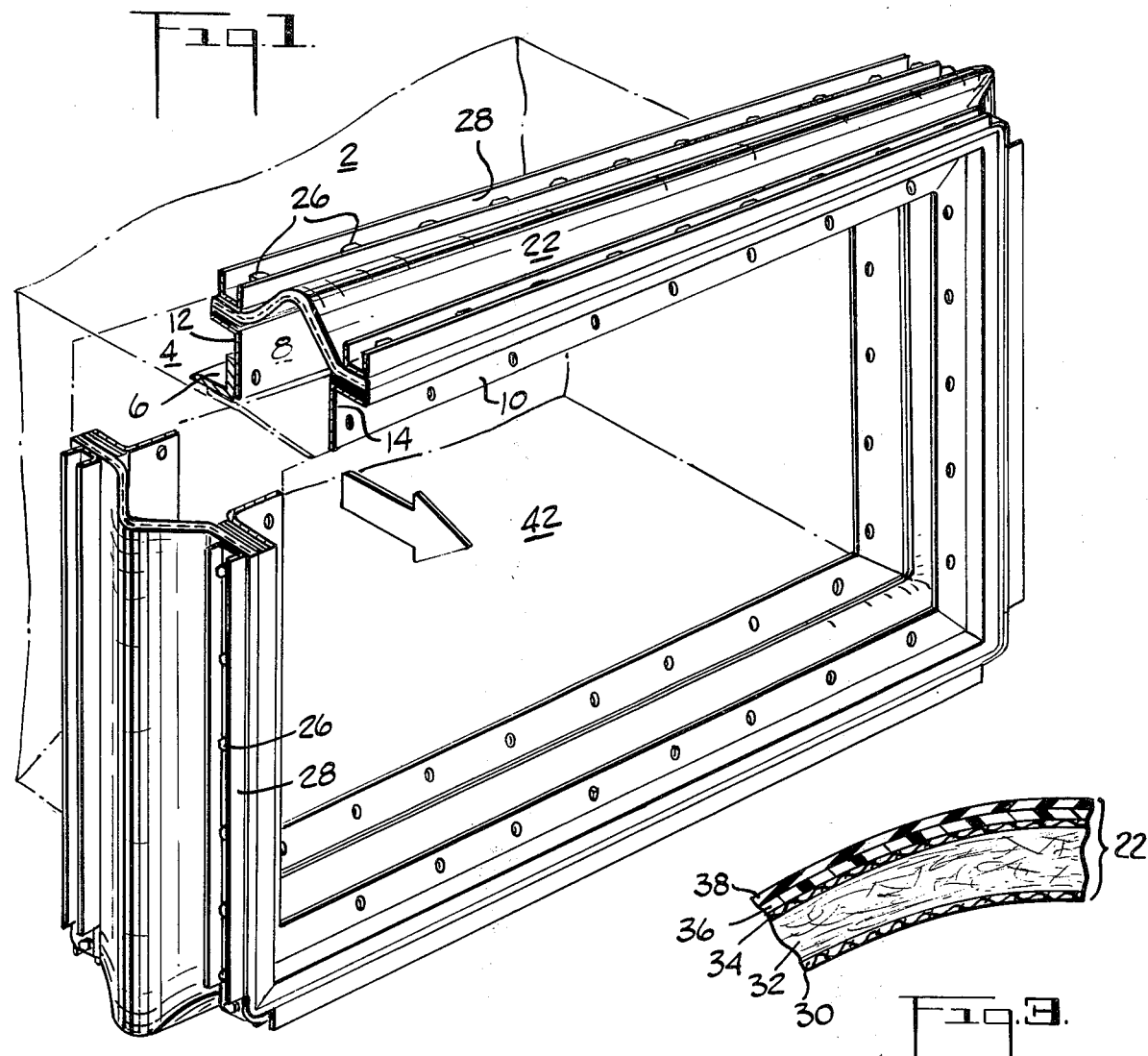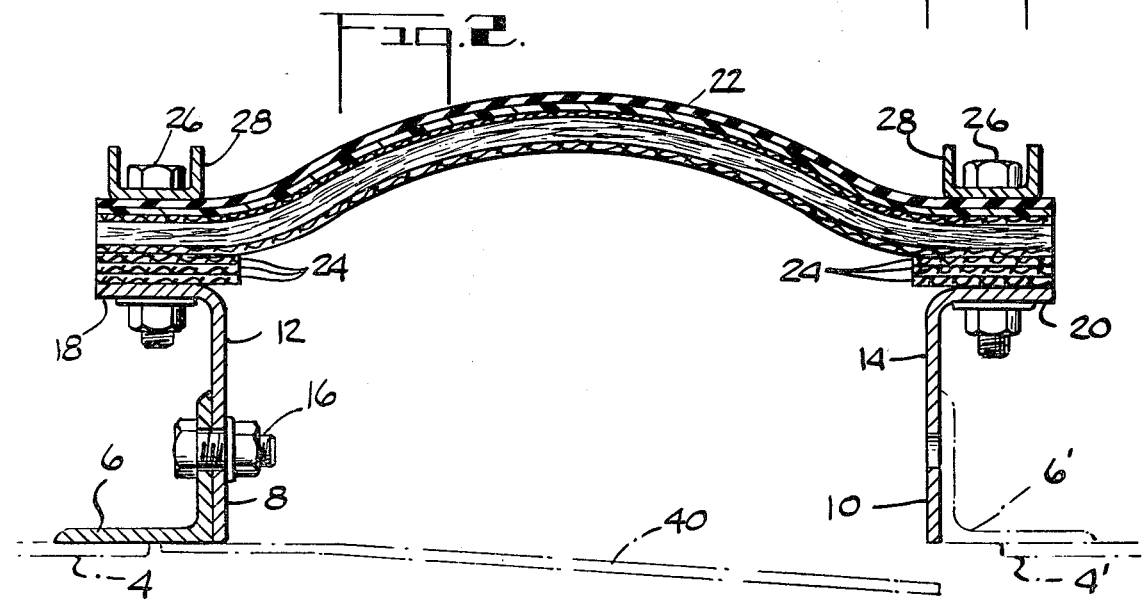

HIGH TEMPERATURE EXPANSION JOINT

BACKGROUND OF THE INVENTION

The invention herein relates to expansion joints for joining the ends of two adjacent ducts in order to compensate for expansion, contraction and other relative movement of the duct ends. In particular it relates to expansion joints for use with duct work carrying gases at a temperature of 400° F. to 800° F. (204° C. to 427° C.).

BRIEF DESCRIPTION OF THE INVENTION

The invention herein comprises an expansion joint for use in flexibly joining two adjacent ducts through which flows gas at a temperature of 400° F. to 800° F. (204° C. to 427° C.). The expansion joint comprises (a) a pair of spaced apart frames adapted to be connected to the opposed faces of the ducts and having central openings therethrough corresponding in size and shape to the internal cross-sectional size and shape of the ducts; (b) spacer means extending outwardly from the frames to support the ends of a flexible boot at a distance spaced apart from the duct and the hot gases which flow therethrough; and (c) a flexible boot spanning the space between the pair of frames and affixed to the spacer means. The boot comprises a laminated sheet which comprises, in order from the hot face, (1) an asbestos fabric coated with aluminum and silica, (2) a fibrous insulating batt, (3) an asbestos fabric coated with aluminum, (4) a polymer film, and (5) an asbestos sheet coated with fluorocarbon elastomer.

BRIEF DESCRIPTION OF THE DRAWINGS

FIG. 1 is a perspective view partially cut away showing the general configuration of the expansion joint of the present invention.

FIG. 2 is a longitudinal cross-sectional view of one side of the expansion joint of this invention.

FIG. 3 is a fragmentary expanded cross-sectional view of the boot of the expansion joint of the present invention.

DETAILED DESCRIPTION AND PREFERRED EMBODIMENTS

The expansion joint of the present invention will be best understood by reference to the attached drawings. One of a pair of spaced apart ducts is shown in phantom in FIG. 1 and designated 2. This duct has a terminal portion 4 to which is attached the expansion joint of the present invention. In the illustrations of FIGS. 1 and 2 this terminal portion 4 is shown as a flat rectangular section to which the expansion joint is secured by means of angle irons 6. However, it is also common to have ducts terminate in upstanding flanges which function in the same manner as the angle irons 6. For the purposes of description of the present invention it is not material which mode of securing the expansion joint to the duct is used and the expansion joint may have a securing means compatible with a flat terminal portion 4 as shown or a terminal portion 4 containing upstanding flanges. For brevity in the present description either form of terminal portion 4 to which the expansion joint is to be attached will be referred to as the "face" of duct 2.

The expansion joint comprises a pair of spaced apart and essentially parallel frames 8 and 10 through which there is a central opening 42 which corresponds in size and shape to the interior dimensions of the ducts. These frames 8 and 10 are attached to the face of the terminal portion 4 of the duct 2 or the terminal portion 4' of the opposite duct respectively as shown in FIG. 2. In the embodiment shown the frames are bolted to the angle irons which in turn are secured (by bolting or welding not shown) to the duct. If the angle irons 6 and 6' were replaced by upstanding flanges at the ends of terminal portions 4 and 4' the frames 8 and 10 could be bolted directly to the flanges in a manner analogous to that shown.

The frames are conventionally of steel or other similar metal construction material. Where particularly corrosive gases are to be encountered various forms of stainless steel or other specialty steels or alloys may be used.

Extending outwardly from the frames are spacer means 12 and 14 respectively. In the embodiment shown the spacer means are integral with the extended portions of the frames and form the outer terminal portions of the frames. Howver, the spacer means can be separate in (for instance) an embodiment wherein the frames terminate just outwardly of the bolts 16 and the spacer means are attached to the outer extremities of the flanges as by butt welding or lap welding. For simplicity and economy the embodiment in which the extended outward portions of the frames comprise the spacer means as shown is preferred.

The spacer means terminate in flanges 18 and 20 to which the boot of the expansion joint is attached. The length of the spacer portion may be any length desired for dissipation of heat and for spacing the boot out of the flow path of the hot gas. Typically, however, the combined length of the spacer portion and the frame will be on the order of from about 5 inches to about 8 inches (12.7 to 20.3 cm) measured outwardly from the parameter of opening 42.

Mounted on the flanges 18 and 20 is boot 22. It is desirable to have boot 22 spaced apart from flanges 18 and 20 by thermal insulation strips 24. Typically these may be strips of asbestos tape which are punched with suitable holes to accommodate bolts 26. The use of thermal insulation strips 24 minimizes the amount of heat transferred from the metal flanges 18 and 20 to the ends of boot 22 and thus substantially extends the service life of the boot.

Boot 22 is secured to flanges 18 and 20 by bolts 26 and channel irons 28.

Boot 22 is made up of five component layers. The inner layer 30 comprises an asbestos cloth saturated and coated with colloidal aluminum pigment and colloidal silica. The asbestos cloth will normally be AAA grade and preferably will be wire reinforced. The thickness will be on the order of 1/16 inch to 3/32 inch (1/6 to 2.4 mm).

The second layer 32 is the insulating layer and comprises a fibrous insulating batt on the order of ¾ inch to 1½ inches (19 to 38 mm) thick, and preferably about 1 inch (25 mm) thick. This fibrous batt may be made of glass fiber, rock wool fiber, slag fiber or the like insulating fibers.

The middle layer 34 comprises an asbestos cloth coated and impregnated with a colloidal aluminum pigment. This layer will be similar to the inner layer 30 except that it contains no silica in the coating and preferably is not wire reinforced. The grade of asbestos and the thickness of the layer will be the same as for layer 30.

The fourth layer 36 is a thin polymer film which serves as a vapor barrier. The polymer selected must be one which can withstand elevated temperatures. Preferably this film will be polytetrafluoroethylene. The polymeric vapor barrier will be on the order of 7 mils to 15 mils (0.2 to 0.4 mm) thick.

The fifth and outermost layer 38 is a light grade of asbestos cloth coated and impregnated with a fluoroelastomer such as the elastomer commercially available under the trade name "Viton." This outermost layer 38 will be on the order of 1/32 inch to 3/32 inch (0.8 to 2.4 mm) thick.

The entire assemblage of layers may be held together by lapping the three outermost layers 34, 36 and 38 around the outside of the two innermost layers 30 and 32 so that the ends of the three outermost layers extend inwardly on the inside of the boot for a short distance, typically approximately 1 inch to 1½ inches (25 to 38 mm) and form in cross-section a C-shape. Staples are then driven through the edges including the overlapping portions to secure the boot into a unitary assemblage. Alternatively stitching or high temperature resistant adhesives may be used.

An expansion joint of this type may readily be designed to span flange-to-flange distances between adjacent ducts of between 6 inches and 24 inches (15 to 60 cm). They will absorb compression ranging from about 2 inches to 8 inches (5 to 20 cm). Extensions on the order of approximately ½ inch (12 mm) and lateral offsets of about 1 inch to 4 inches (2.5 to 10 cm). Operating temperature ranges of the internal gases may be in the range of from about 400° F. to 800° F. (205° C. to 427° C.).

In many cases it is desirable to include a baffle 40 in the expansion joint to deflect corrosive particles and direct gas flow away from boot 22. Such baffles are conventional and need not be further described here.

What is claimed is:

1. An expansion joint for use in flexibly joining two adjacent spaced apart ducts through which flows gas at a temperature of 400° F. to 800° F., said joint comprising:

(a) a pair of spaced apart frames adapted to be connected to the opposed faces of said ducts, with each frame having a central opening therethrough corresponding in size and shape to the internal configuration of the ducts;
    (b) spacer means extending outwardly from each of said frames to support the ends of a flexible boot at a distance spaced apart from the duct and the hot gases which flow therethrough; and
    (c) a flexible boot affixed at each end to said spacer means and spanning the space between said pair of frames, said boot comprising:
        (i) an innermost layer comprising an asbestos fabric coated with aluminum and silica;
        (ii) next outwardly from said innermost layer and adjacent thereto, a fibrous insulating batt;
        (iii) next outwardly from said fibrous batt and adjacent thereto, a middle layer comprising an asbestos fabric coated with aluminum;
        (iv) next outwardly from said middle layer and adjacent thereto, a vapor barrier comprising a heat resistant polymeric film; and
        (v) adjacent to said vapor barrier an outermost layer comprising an asbestos fabric coated with a fluorocarbon elastomer.

2. An expansion joint as in claim 1 wherein each of said spacer means and said frame forms a unitary structure with said spacer means comprising the outward portion of said unitary structure and said frame comprising the inward portion of said unitary structure.

3. An expansion joint as in claim 1 wherein said fibrous insulation batt comprises glass fibers.

4. An expansion joint as in claim 1 wherein said vapor barrier comprises a polytetrafluoroethylene film.

5. An expansion joint as in claim 1 wherein said innermost layer further comprises wire reinforcement in the asbestos fabric.

6. An expansion joint as in claim 1 further comprising thermal insulation disposed between the surface of said spacer means and said boot.

7. An expansion joint as in claim 6 wherein said thermal insulation comprises at least one strip of asbestos fabric.

* * * * *

UNITED STATES PATENT AND TRADEMARK OFFICE
CERTIFICATE OF CORRECTION

PATENT NO. : 4,140,338
DATED : February 20, 1979
INVENTOR(S) : John Kazmierski, Jr. et al It is certified that error appears in the above-identified patent and that said Letters Patent are hereby corrected as shown below:

Column 2, line 21, "Howver" should read --However--.

Column 2, line 37, "parameter" should read --perimeter--.

Column 2, line 54, "1/6" should read --1.6--.

Signed and Sealed this

Nineteenth Day of June 1979

[SEAL]

Attest:

RUTH C. MASON
Attesting Officer

DONALD W. BANNER
Commissioner of Patents and Trademarks